(12) United States Patent
Kabel

(10) Patent No.: US 11,184,042 B1
(45) Date of Patent: Nov. 23, 2021

(54) PARTIAL BAND SIGNAL RECONSTRUCTION USING ARBITRARY NUMBERS OF SYNTHESIS CHANNELS

(71) Applicant: BAE Systems Information and Electronic Systems Integration Inc., Nashua, NH (US)

(72) Inventor: Allan M. Kabel, Hollis, NH (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 0 days.

(21) Appl. No.: 16/992,491

(22) Filed: Aug. 13, 2020

(51) Int. Cl.
*H04B 1/10* (2006.01)

(52) U.S. Cl.
CPC .................. *H04B 1/1027* (2013.01)

(58) Field of Classification Search
CPC .................................................. H04B 1/1027
See application file for complete search history.

(56) References Cited

U.S. PATENT DOCUMENTS

| 6,792,057 | B2 | 9/2004 | Kabel et al. |
| 2004/0042557 | A1* | 3/2004 | Kabel .............. H04B 1/406 |
| | | | 375/260 |
| 2017/0026205 | A1* | 1/2017 | Agee .............. H04L 27/264 |

* cited by examiner

*Primary Examiner* — Curtis B Odom
(74) *Attorney, Agent, or Firm* — Finch & Maloney PLLC; Scott J. Asmus

(57) ABSTRACT

Techniques are disclosed for partial band signal reconstruction. A partial band signal reconstruction circuit includes a zero generator, an analysis filter, and a synthesis filter. The zero generator is configured to generate a zero-value channel (i.e., a signal of all zeros). The analysis filter is configured to convert a wideband time-domain signal into K narrowband channels, and to select at least R of the K frequency-domain subchannels for synthesis. The synthesis filter is configured to receive the at least R subchannels from the analysis filter and the zero or more zero-value channels from the zero generator and convert the at least R subchannels and the zero-value channels (a total of P channels) into a time-domain signal. The values of K and P are related by a constraint that constrains one or more parameters of the analysis filter and the synthesis filter.

20 Claims, 6 Drawing Sheets

PARTIAL BAND SIGNAL RECONSTRUCTION USING ARBITRARY NUMBERS OF SYNTHESIS CHANNELS

FIELD OF THE DISCLOSURE

This disclosure relates generally to signal processing and more particularly, to partial band signal reconstruction and filter designs for partial band reconstruction of a wideband channelizer using an arbitrary number of synthesis channels.

BACKGROUND

Radio frequency receiver systems are configured to extract information from radio frequency (RF) signals of interest. One such receiver system is a channelized receiver. A channelized receiver includes an antenna and an RF front end that intercepts RF energy and performs signal conditioning and down-conversion to an intermediate frequency (IF). There are several characteristics of the receiver system that may increase the ability of the system to intercept a signal of interest, including broadband instantaneous frequency coverage, good sensitivity, large dynamic range, simultaneous signal detection, arbitration and parameter encoding, and fine frequency measurement. However, high sensitivity, narrowband intercept receivers are difficult to tune to a signal having an unknown frequency. In particular, reducing the bandwidth of the receiver may increase its sensitivity, but this results in tuning difficulties because the narrow bandwidth must be more precisely centered with respect to the potential incoming signal of interest. Thus, there remain a number of non-trivial issues associated with receiving unknown signals of interest using a wideband receiver.

DETAILED DESCRIPTION

Figure 1:
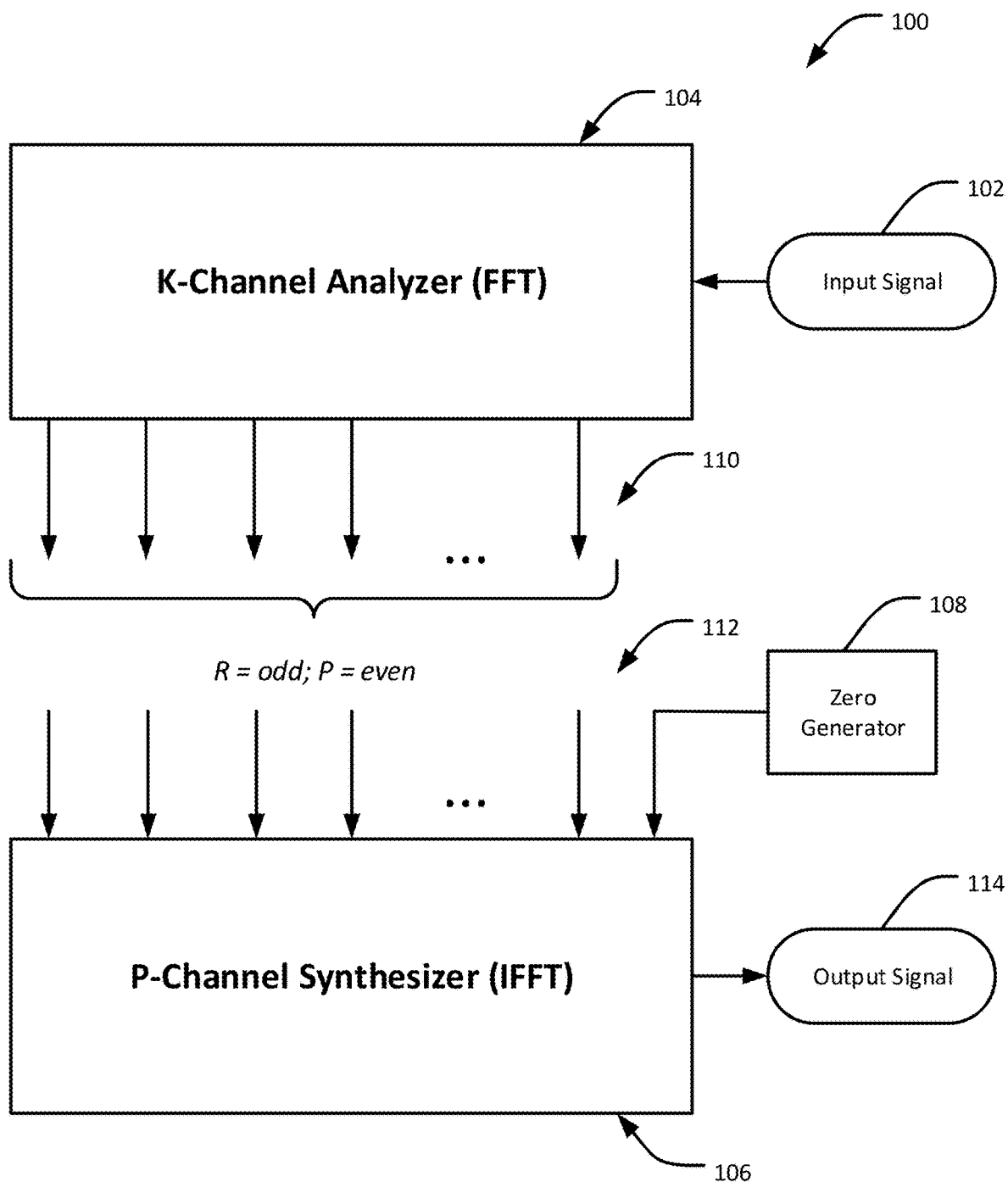
FIG. 1 shows a block diagram of an example partial band signal reconstruction system, in accordance with an embodiment of the present disclosure.

Techniques are disclosed for receiving unknown signals of interest using a wideband receiver. The techniques are particularly well-suited for partial band signal reconstruction. In accordance with an embodiment of the present disclosure, a partial band signal reconstruction circuit includes a zero generator, an analysis filter, and a synthesis filter. The zero generator is configured to generate at least one zero-value channel (a signal of all zeros). The analysis filter is configured to receive an input signal, which it converts into K channels. Of these K channels (also known as frequency-domain subchannels, or bins), at least R of them are sent to the synthesis filter. The synthesis filter is configured to receive the at least R subchannels from the analysis filter and zero, or more, zero-value channels from the zero generator, and to convert the R subchannels and the zero-value channel(s) (if any) into P time-domain signal channels. In certain embodiments, K, R, and P are arithmetically related. As will be appreciated in light of this disclosure, the design of the analysis/synthesis cascade filter allows for partial band reconstruction, where an arbitrary number of subchannels are recombined. In addition, the filter described in this disclosure performs better than current filter designs, in terms of frequency aliasing levels, according to some embodiments of the present disclosure. Numerous variations will be appreciated.

General Overview

As noted above, there remain a number of non-trivial issues associated with receiving unknown signals of interest using a wideband receiver. In more detail, wide bandwidth signals can be subdivided, or channelized, into several narrower bandwidth signals for further processing. Partial band reconstruction is a technique that takes a received signal and decomposes it into several subchannels, or bins, using a fast Fourier transform (FFT) to create an analysis filter bank. Some of the subchannels are subsequently selected and combined for reconstructing a bandlimited portion of the original signal using suitable analysis and reconstruction (synthesis) filters. The analysis filter can be decimated in time by retaining one sample in every M samples output by the FFT. One may also consider the ratio K/P, which equals the number of analysis bins divided by the number of synthesis bins. When the ratio (K/P) is an integer, such as when both K and P are powers of two, the partial band reconstruction is effective at minimizing aliasing and other undesirable effects. However, the number of bins needed for reconstruction in a given situation is not necessarily a power of two, depending on the input signal and the amount of bandwidth containing useful information. When the number of reconstruction bins is not a power of two, then existing reconstruction techniques require processing an additional number of bins such that the total number of reconstruction bins is a power of two. These additional bins may not contain useful information, and they may even contain unwanted interferers, but they must nevertheless be processed when using certain existing reconstruction techniques. Therefore, to reduce this processing overhead, it would be desirable to minimize or eliminate the number of additional bins used during channel reconstruction.

To this end, and in accordance with embodiments of the present disclosure, techniques are disclosed for partial band signal reconstruction with an arbitrary number of channels. The techniques may be implemented, for instance, in the design of an analysis/synthesis filter used in partial band reconstruction, where the design allows an arbitrary number of subchannels to be recombined, and which utilizes a filter that performs better than current filter designs, particularly with respect to frequency aliasing levels.

According to some such embodiments, and as will be further explained in turn, an arbitrary number of subchannels can be recombined by judiciously adding one or more zero-valued channels during the synthesis phase. In more detail, a partial band signal can be reconstructed by performing an inverse FFT (IFFT) of the same size as the number of channels being combined. For example, it is possible to perform an FFT of size 10 in the synthesizer. In some embodiments, as noted above, the number of reconstructed channels can be arbitrary, as long as the analysis FFT size (K) bears a certain relation to the synthesizer IFFT size (P). To achieve this, a wideband time-domain input signal is fed into a K-channel analyzer having K subchannels. Of these K subchannels, R subchannels, where R is an arbitrary number, are selected for reconstruction. In accordance with certain embodiments, P, the IFFT size, can be any even number. Thus, in such embodiments, an even number of subchannels R can be reconstructed using an IFFT with a size that equals the even number of channels (e.g., for combining four channels, an IFFT having a size of four can be used). An odd number of subchannels R can be reconstructed using an IFFT with a size P that is increased to the next even number (e.g., for combining five channels, an IFFT having a size of six can be used). In this case, a zero-value channel is fed into the IFFT such that P=R+1 (i.e. the number of subchannels to be recombined, plus one zero-value channel), and thus P is an even number.

Partial Band Signal Reconstruction for an Arbitrary Number of Channels

FIG. 1 shows a block diagram of an example partial band signal reconstruction system 100, in accordance with an embodiment of the present disclosure. The system 100 allows the use of efficient partial band reconstruction using only frequency-domain subchannels of a large bandwidth input signal 102 that pertain to the signal of interest. The time-domain input signal 102 is provided to an analyzer/synthesizer cascade including a K-channel analyzer 104 and a P-channel synthesizer 106. The analyzer 104 decimates the input signal 102 at a rate M into K equally spaced time-domain subchannels 110, each having a small bandwidth relative to the input signal 102. The synthesizer 106 combines at least R adjacent subchannels of the K 112 and interpolates the subchannels at a rate L to produce a time-domain output signal 114 having approximately P times the bandwidth of a single subchannel 112. R is the number of subchannels of interest. The total number of combined subchannels P is always equal to, or greater than R. In certain embodiments, P=R when R is an even number, and in some cases P=R. However, in such embodiments, when R is an odd number, the R subchannels 112 are provided to the synthesizer 112 and a zero generator 108 supplies a zero signal as the $P^{th}$ subchannel 112 into the synthesizer 106, such that P=R+1. The analyzer 104 and synthesizer 106 thus allow the use of a single wideband input signal to provide for data channelized for detection processing, and the ability to recombine an arbitrary number of adjacent channels R into the synthesized output signal 114 suitable for further information processing.

The synthesizer 106 is configured to act as an inverse-FFT (IFFT). The size of the synthesis IFFT (P) is set in accordance with the constraint equation (C1), which constrains the parameters of the synthesis filter to be time-invariant:

$$\frac{K}{M} = \frac{P}{L} \quad \text{(C1)}$$

where K is the number of subchannels, L is the interpolation factor, and M is the decimation factor. In some embodiments, Constraint C1 provides that the size of the synthesis IFFT (P) will equal the next power of two equal to, or greater than, the number of reconstructed channels K:

$$P = \left\{ \text{The smallest power of } 2 \Big| \frac{P}{2} < R \le P \right\} \quad \text{(C2)}$$

Constraint C2 is a general constraint, valid whenever the synthesis FFT size P is a power of two. However, in some embodiments, it is feasible to make P equal to the smallest even number equal to, or greater than, R:

$$P = 2\left\lfloor \frac{R+1}{2} \right\rfloor \quad \text{(C3)}$$

In this manner, the desired signal can be reconstructed from an arbitrary number of subchannels, or bins, when the IFFT size P satisfies C1. In some embodiments, that follow Constraint Equation (C3), if the number of bins is even, then all of the bins are combined. And, if the number of bins is odd, then one additional bin of zeros is concatenated to the combination of the other bins.

If K/M=2, the IFFT size is set to be the next even number equal to, or higher, than the number of channels, as given by Constraint Equation (C3).

The synthesizer's IFFT revisit interval can be set to:

$$L = \frac{PM}{K} \text{ samples}$$

The synthesis filter can be designed as discussed in further detail below. During synthesizer operation, the R selected bins (channels) of data are augmented with (P−R) bins containing all zeros. This is equivalent to multiplying the top (P−R) data bins by zero. The synthesis operation then performs a P-point IFFT on the concatenation of the R selected bins and the (P−R) zero bins, using the synthesis filter. Everything else in the recombination procedure remains unchanged. For example, three subchannels 112 can be recombined by adding one zero-valued channel from the zero generator 108 to the three selected subchannels and performing a 4-point IFFT 106 as part of the synthesis.

End-to-End Response of the Analyzer/Synthesizer Cascade

Figure 2A:
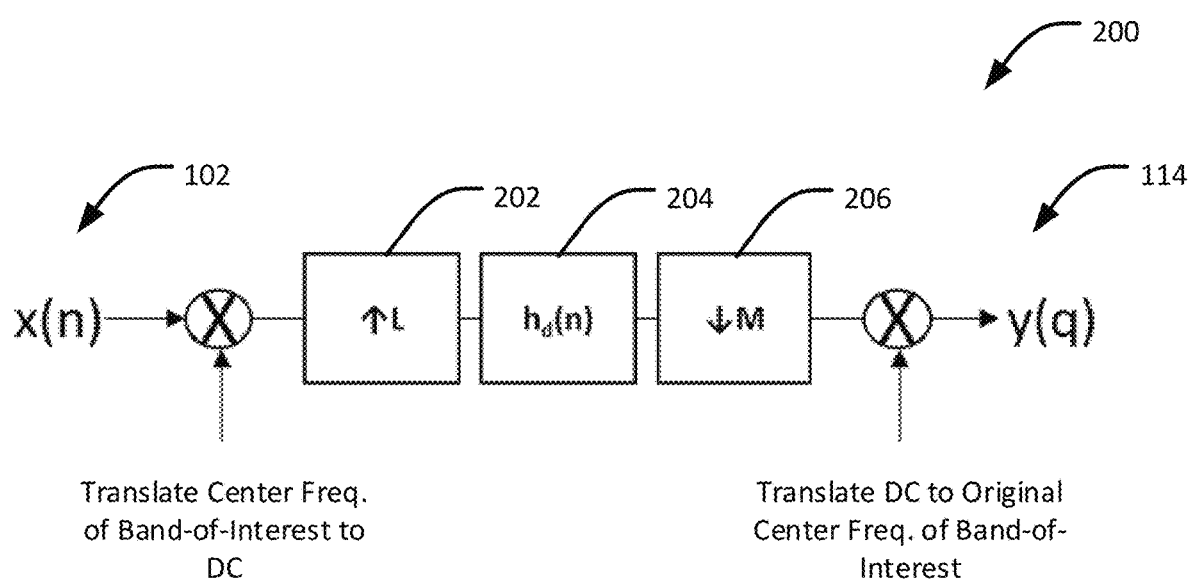
FIG. 2A is a block diagram representing example operations of an analyzer/synthesizer filter cascade, in accordance with an embodiment of the present disclosure.

FIG. 2A is a block diagram representing example operations similar to the example analyzer/synthesizer filter cascades 100 and 200a, in accordance with an embodiment of the present disclosure. In FIG. 2A, the analyzer/synthesizer filter cascade 200 is configured to translate the wide bandwidth input signal 102 x(n) such that the band-of-interest frequency (for analysis) is centered at a constant zero-frequency (DC) value. The centered signal is interpolated by an interpolation unit 202 by a factor of L and applied to a lowpass filter $h_d(n)$ 204. The output of the filter 204 is decimated by a decimation unit 206 by a factor of M and translated back up to the original center frequency of the band-of-interest of the input signal x(n) 102 to produce the output signal y(q) 114.

Figure 2B:
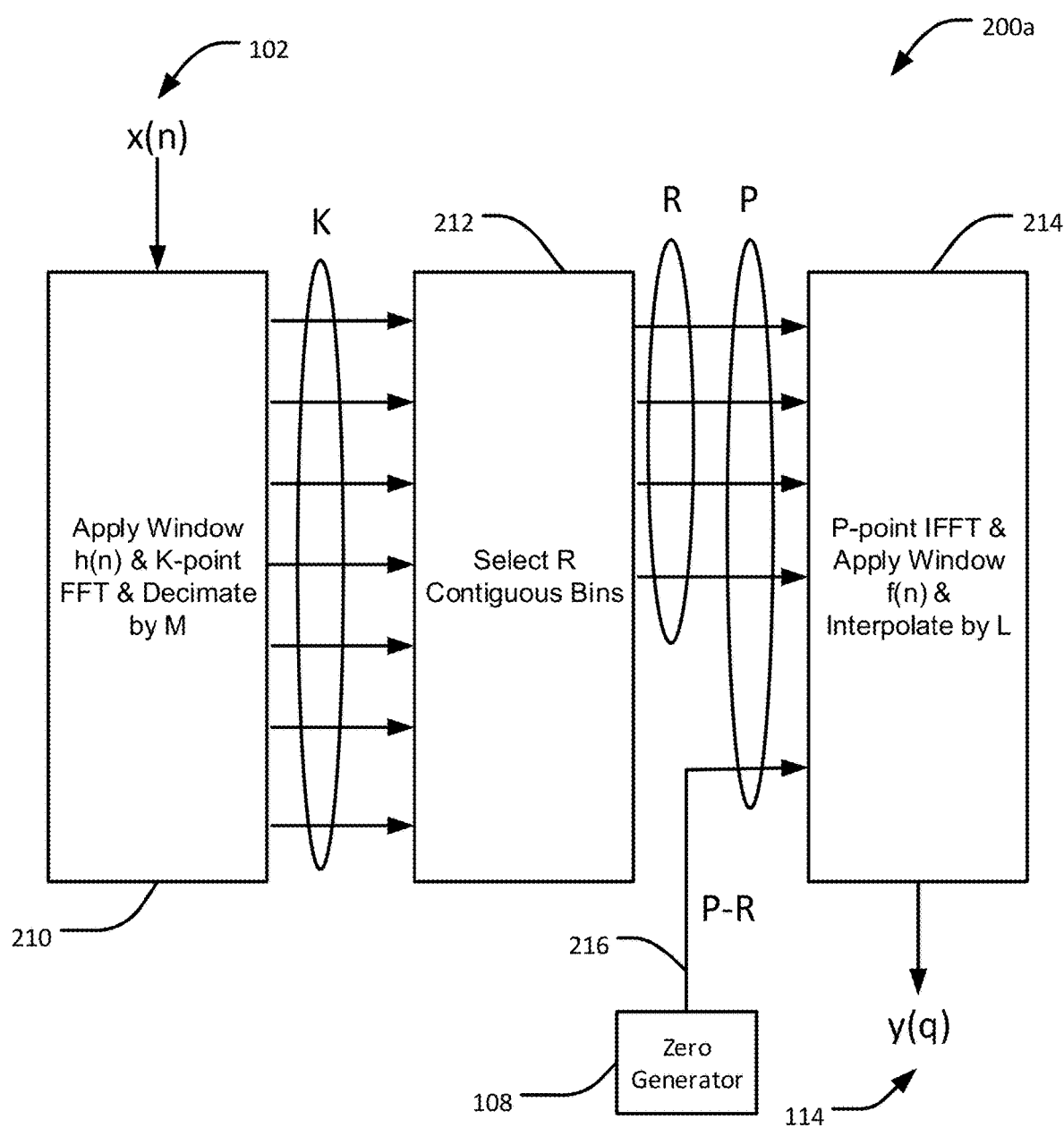
FIG. 2B is a block diagram representing another example analyzer/synthesizer filter cascade, in accordance with an embodiment of the present disclosure.

FIG. 2B is a block diagram representing an example analyzer/synthesizer filter cascade 200a, in accordance with an embodiment of the present disclosure. In FIG. 2B, the analyzer/synthesizer filter cascade 200a is configured to translate, via FFT, the wide bandwidth input signal 102 x(n) such that the band-of-interest frequency (for analysis) is centered at a constant (DC) value, such as shown in FIG. 2A. The input signal is windowed with filter h(n), analyzed into K channels, and decimated by a factor of M, as indicated at 210. The window function is related to the desired filter $h_d(n)$. Of the K channels, R consecutive channels or bins are selected 212. An arbitrary number of channels R from the K-point FFT 210 are passed to the P-point IFFT 214. In some embodiments, if R is an odd number, then a zero-value channel 216 is also passed to the P-point IFFT 214, such that P=R+1. In such embodiments, if R is an even number, then the zero-value channel 216 is not used. In other embodiments multiple zero-value channels may be used. The P streams are put through the inverse-FFT 214, and combined using window f(n), and interpolated by factor L, to produce the output signal y(q) 114.

In accordance with an embodiment of the present disclosure, an actual end-to-end response of a partial band reconstruction technique is based on the design of the analyzer/synthesizer cascade, which can be represented mathematically by an analysis filter h(n), a synthesis filter f(n), and a set of time-invariant channel multipliers $\{G_k\}$, for each of P synthesis channels $\{0, 1, \ldots, P-1\}$:

$$\hat{y}(q) = \sum_{n=-\infty}^{\infty} x(n) \sum_{m=-\infty}^{\infty} f(q-mL)h(mM-n)\frac{1}{P}\sum_{k=0}^{P-1} G_k e^{j2\pi(\frac{q}{P}-\frac{n}{K})k}; \forall q \quad (1)$$

where x(n) is the input signal, $\hat{y}(q)$ is the output signal, L is the sampling rate (interpolation factor) of the synthesized (recombined) signal, and M is the sampling rate (decimation factor) of the analyzed (channelized) signal.

The set of multipliers $\{G_k\}$ attenuates, or boosts, individual channels. In some cases, the multipliers can be used to either block a channel ($G_k$=0) or pass a channel ($G_k$=1) through the filters f(n) and h(n). This allows the partial band signal to be reconstructed from an arbitrary number of channels.

Equation (1) provides the actual end-to-end response when P channels are recombined, such as in FIG. 2A, which may be different than the desired end-to-end response of a partial band reconstruction. For example, it may be desired to design a bandpass filter that passes exactly R bins of interest, where R≠P, such as in FIG. 2B. To avoid complex-valued filter coefficients, the lowpass filter 204 is designed with the correct width P and combined with (P−R) zero-value channels, such as shown in FIGS. 1 and 2B, thus having a P-point IFFT during synthesis, to get the same effect as a bandpass filter of the same bandwidth. The resulting design performs similarly to the case where R=P.

A formula that describes the desired end-to-end response can be based in part on $k_0$ and $k_1$, which are the index numbers of the lowest and highest bins, respectively, to be used in reconstruction. In some embodiments, $k_0$=0. A variable S representing their sum is defined as:

$$S = k_0 + k_1$$

For example, to recombine bins 0 through 9, $k_0$=0 and $k_1$=9, and thus S=9. Using the above definition for 5, the end-to-end response can be written for input x(n) and output y(q) as:

$$y(q) = \sum_{n=-\infty}^{\infty} h_d(Mq-nL)x(n)e^{j\frac{\pi S}{K}(\frac{Mq}{L}-n)}; \forall q \quad (2)$$

Constraint Equations Using a Desired Bandpass Response

The desired response y(q) can be equated to the actual response y(q), which is done by setting the left-hand sides of Equations (1) and (2) equal to each other and requiring them to apply for every value of n. The values for the $G_k$ in Equation (1) can be set to harmonize with the bins used in Equation (2):

$$G_k = \begin{cases} 0; & 0 \le k < k_0 \\ 1; & k_0 \le k \le k_1 \\ 0; & k_1 < k \le P-1 \end{cases} \quad (3)$$

In Equation (3), the start and end indices are both less than, or equal to, P, and in some embodiments, $k_0$=0, for design purposes. Thus, setting Equation (1) equal to Equation (2) for each x(n), applying Equation (3), and simplifying yields:

$$h_d(Mq-nL)e^{j\frac{\pi S}{K}(\frac{Mq}{L}-n)} = \\ \sum_{m=-\infty}^{\infty} f(q-mL)h(mM-n)\frac{1}{P}\sum_{k=k_0}^{k_1} e^{j2\pi(\frac{q}{P}-\frac{n}{K})k}; \forall q, \forall n \quad (4)$$

The last summation in Equation (4) can be simplified as:

$$\sum_{k=k_0}^{k_1} e^{j2\pi(\frac{q}{P}-\frac{n}{K})k} = e^{j\pi S(\frac{q}{P}-\frac{n}{K})} \frac{\sin\pi(\frac{q}{P}-\frac{n}{K})\Delta}{\sin\pi(\frac{q}{P}-\frac{n}{K})} \quad (5)$$

where:

$$\Delta = k_1 - k_0 + 1 \quad (6)$$

Further simplification yields:

$$h_d(Mq-nL)e^{j\frac{\pi S}{L}(\frac{M}{K}-\frac{L}{P})q} = \\ \sum_{m=-\infty}^{\infty} f(q-mL)h(mM-n)\frac{\sin\pi(\frac{q}{P}-\frac{n}{K})\Delta}{P\sin\pi(\frac{q}{P}-\frac{n}{K})}; \forall q, \forall n \quad (7)$$

As discussed above, constraint (C2) is a general constraint, valid any time the analysis FFT size (K) is a power of two. In some embodiments, P can be equal to the smallest even number equal to, or larger than, Δ (Equation (6)). Then the desired signal can be reconstructed from an arbitrary number of bins (in which case, the IFFT size P satisfies (C1)).

Using constraints (C1) and (C2) in Equation (7) simplifies it to a time-invariant set of equations for determining the synthesis filter:

$$h_d(Mq-Ln) = \sum_{m=-\infty}^{\infty} f(q-mL)h(mM-n)\frac{\sin\frac{\pi}{KL}(Mq-Ln)\Delta}{P\sin\frac{\pi}{KL}(Mq-Ln)}; \forall q, \forall n \quad (8)$$

Simplifications to the Synthesis Filter Design Equations

Equation (8) may be simplified further by choosing to design the desired filter $h_d(n)$ with the window method of FIR filter design. The window method applies a taper window w(n) to truncate the infinite extent of an ideal lowpass filter:

$$h_d(n) = w(n)h_{ideal}(n)$$

A design parameter of the ideal filter is its cutoff frequency $\omega_c$, which can be expressed in terms of FFT bins:

$$\omega_c = \frac{2\pi k_c}{KL}; 0 \leq k_c \leq \frac{P}{2}$$

Note that P/2 is the maximum value of $k_c$ to prevent aliasing. The desired lowpass filter 204 of FIG. 2A can be expressed in terms of the taper window and a sinc function, based on the ideal lowpass filter with cutoff frequency $\omega_c$:

$$h_d(n) = \frac{w(n)\sin\left(\frac{2\pi k_c n}{KL}\right)}{\pi n} \quad (9)$$

Equation (9) can be substituted into Equation (8). In addition, a new variable v is defined for convenience:

$$v = Mq - Ln \quad (10)$$

When Equations (8), (9), and (10) are combined, this yields:

$$\frac{w(v)\sin\left(\frac{2\pi k_c v}{KL}\right)}{\pi v} = \sum_{m=-\infty}^{\infty} f(q-mL)h(mM-n)\frac{\sin\frac{\pi v\Delta}{KL}}{P\sin\frac{\pi v}{KL}}; \forall q, \forall v \quad (11)$$

Analysis reveals that neither the left-hand—nor the right-hand-sides blow up. However, both sides have zeros, thus to insure good behavior when solving Equation (11), the left-hand-side should be zero whenever the right-hand-side is zero. This is equivalent to:

$$\frac{\pi v\Delta}{KL} = s \Rightarrow \frac{2\pi k_c v}{KL} = t; \text{ for integer values of } s \text{ and } t$$

When this relation is constrained by constraint (C2), it yields:

$$k_c = \frac{\Delta}{2} \quad (12)$$

Substituting Equation (12) into Equation (11) causes exact cancellation of the sine terms in the numerators. After some rearrangement, the final synthesis filter design equation is as follows:

$$\frac{w(v)P\sin\frac{\pi v}{KL}}{\pi v} = \sum_{m=-\infty}^{\infty} f(q-mL)h(mM-n); \forall q, \forall v \quad (13)$$

Where m, q, n, and v are related to each other, in accordance with Equation (10).

As discussed above, P (the size of the IFFT 214 in FIG. 2B) can include at least one zero-value channel combined with R (the desired number of recombined channels), where R is an odd number.

Example Synthesis Filter Design Parameters

The following tables contain the requested MBR parameter settings from one embodiment, along with the derived parameters necessary for an exemplar set of synthesis filters. The analysis FFT sizes are K, and their corresponding analyzer revisit intervals are M. Each of the sizes listed in the table below pairs with the full set of requested partial-band channel recombination values, except for K=16, which only pairs with recombination values from 2 to 16.

| Set of Requested Analysis FFT Sizes (K) | Analyzer Revisit Interval (M) |
|---|---|
| 16 | 8 |
| 1024 | 512 |
| 2048 | 1024 |
| 4096 | 2048 |
| 8192 | 4096 |
| 131,072 | 65,536 |

The following table lists the number of channels recombined in the synthesizer (R), and corresponding parameters. It also lists the synthesizer IFFT sizes (P) tested for each value of R, as well as synthesizer revisit interval (L). Except for K=16, all the parameters in this table are paired up with all the K-values listed in the above table.

| Requested Number of Synthesis Channels (R) | Synthesizer IFFT Sizes (P) | Synthesizer Revisit Interval (L) |
|---|---|---|
| 2 | 2 | 1 |
| 3 | 4 | 2 |
| 4 | 4 | 2 |
| 5 | 6 | 3 |
|   | 8 | 4 |
| 6 | 6 | 3 |
|   | 8 | 4 |
| 7 | 8 | 4 |
| 8 | 8 | 4 |
| 10 | 10 | 5 |
|   | 16 | 8 |
| 16 | 16 | 8 |
| 20 | 20 | 10 |
|   | 32 | 16 |
| 32 | 32 | 16 |
| 40 | 40 | 20 |
|   | 64 | 32 |
| 64 | 64 | 32 |
| 128 | 128 | 64 |

Common Parameters:

| Analyzer Fold Ratio ($F_a$) | 8 |
|---|---|
| Synthesizer Fold Ratio ($F_s$) | 16 |
| Default length of Desired Lowpass Filter (Used in Synthesis Filter Design) | $(P * F_s - 1) * M$ |

Performance Test Results

The aliasing and out-of-band response levels were plotted using a function that evaluates the Z-transform of the output signal on the unit circle. Both types of responses represent unwanted interference, so the maximum value of the aliasing and out-of-band responses were recorded. From these analyses, the interference from the R channels used in the synthesis would very often dominate over the interference from all the unused (K−R) bins emanating from the analyzer. To get a sense of the aliasing generated by the R channels used in the synthesizer, the spectral responses to a pair of complex sinusoids at two frequencies, located at 0 and at $\omega_s$, were measured. For the current R-channel design, placing $\omega_s$ near $2\pi (R-\frac{1}{2})/K$ radians (at the input sampling rate) causes appreciable aliasing when no zero-value channels are added. (Variable K equals the number of analyzer channels.) By contrast, the disclosed technique involving the added zero-value channels does not suffer this problem.

To highlight the interference contributed by the analyzer bins that go unused in the synthesizer, the output signal's relative power versus time were measured, when the arrangement was stimulated by a chirp that cycles through all frequencies. This tactic permits measuring the end-to-end response of the design at all frequencies. The results of these tests are discussed below.

Maximum Levels of Alias and Out-of-Band Responses

Figure 3:
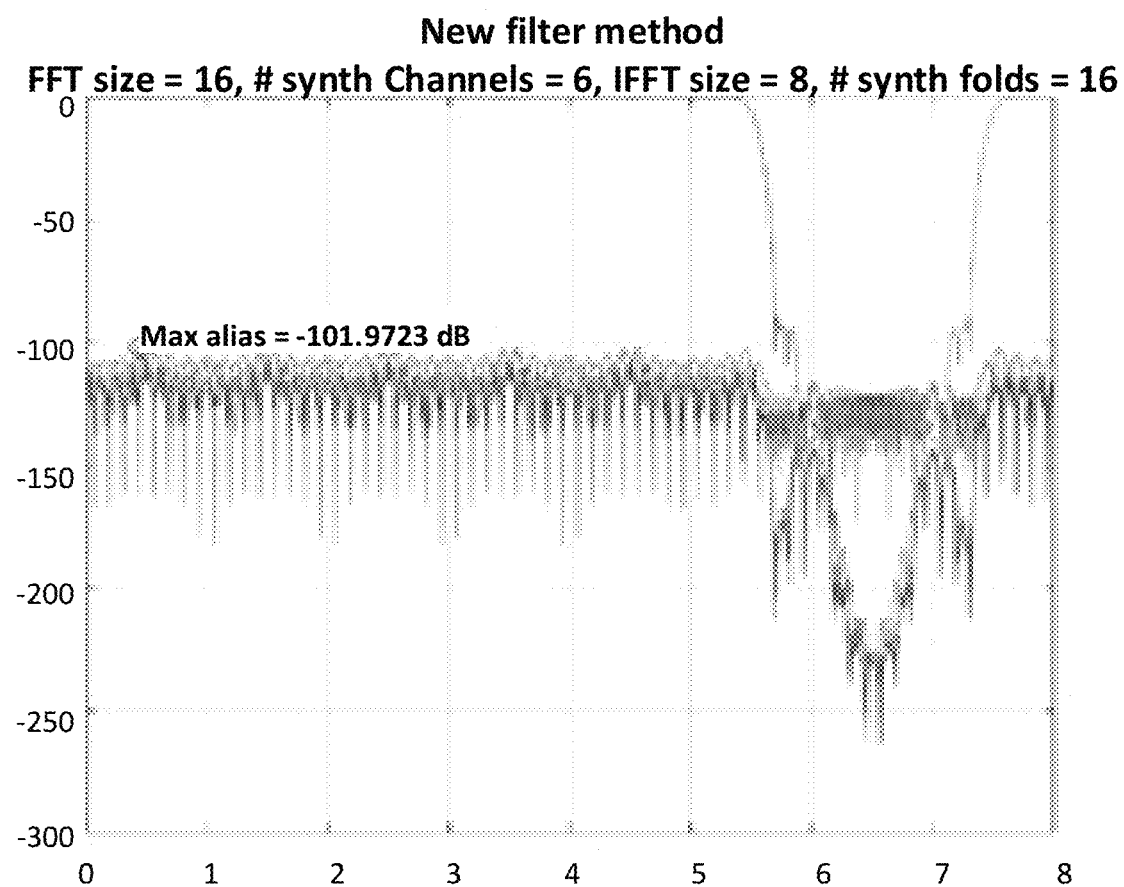
FIG. 3 shows an example alias response of a partial band signal reconstruction system in accordance with an embodiment of the present disclosure.

For maximum flexibility, the maximum unwanted component levels for two situations was plotted: when the IFFT size is the next power-of-two, and when the IFFT size is the next even number. A typical plot for the synthesis filter design of FIG. 1 is shown in FIG. 3. Several regions of interest in the spectral response are distinguished, including the passband response, which is used to normalize the whole plot so that it has a 0-dB relative response; the transition band response, which has a downward slope, but which will often also contain sidelobes; and the alias response, which is caused by energy leaking in from other analysis channels. Generally, the far-away bins cause much less interference than the close-in bins.

Pair of Complex Sinusoids

Figure 4:
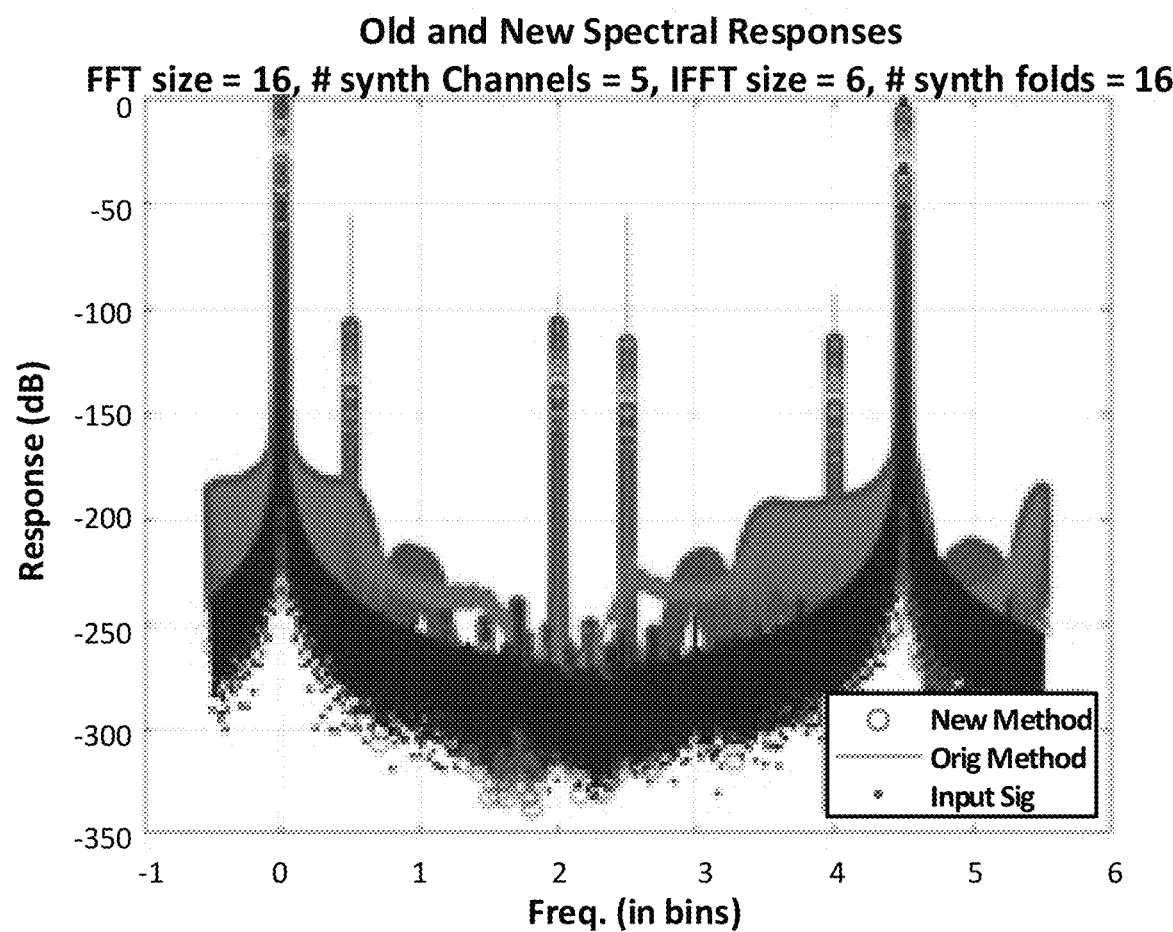
FIG. 4 shows an example spectral response of a partial band signal reconstruction system in accordance with an embodiment of the present disclosure.

A complex exponential at the previously mentioned frequency ws is passed through the filter design of FIG. 1. To ease the normalization task, a DC component is added at the same power level to the complex exponential. FIG. 4 shows a typical result, plotting the relative spectral component powers. For reference, the input signal's spectral components are also included. The maximum alias level is approximately −100 dB.

Example Partial Band Signal Reconstruction Methodologies

Figure 5:
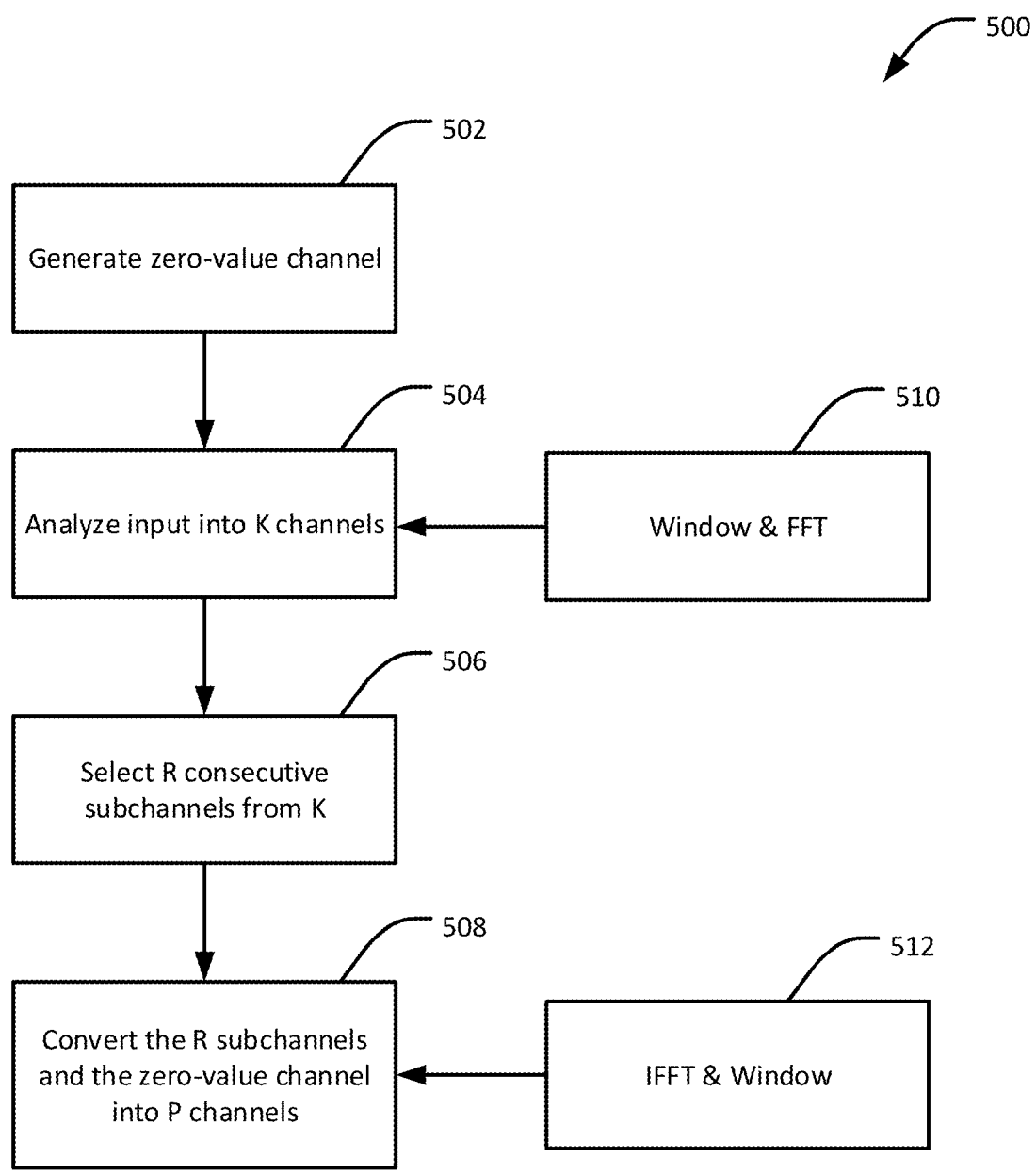
FIG. 5 is a block diagram of an example methodology for partial band signal reconstruction, in accordance with an embodiment of the present disclosure.

FIG. 5 is a block diagram of an example methodology 500 for partial band signal reconstruction, in accordance with an embodiment of the present disclosure. The method 500 can be implemented, for example, at least in part by the system 100 of FIG. 1 or the analyzer/synthesizer filter cascade 200, 200a of FIGS. 2A and 2B. The method 500 includes generating 502 zero or more, zero-value channels. The zero-value channel(s) can, for example, be generated by the zero generator 108. The method 500 further includes analyzing the wideband time-domain signal into K frequency channels 504 using a window function and FFT 510, and selecting 506 R consecutive channels from the K frequency-domain channels. In some embodiments, K is not equal to R. In some embodiments, R is an odd number. The method 500 further includes receiving the R subchannels and converting 508 the R subchannels and the zero or more zero-value channels, generated in 502, into P time-domain signal channels using an IFFT 512 and window function. The R subchannels and the zero, or more zero-value channel(s) can be converted, for example, by the P-channel synthesizer 106. In some embodiments, P is an even number or a power of two.

In some embodiments, the method 500 includes using a fast Fourier transform (FFT) filter bank 510 to convert the wideband input into K channels 506. In some embodiments, the method 500 includes using an inverse fast Fourier transform (IFFT) filter bank 512 to convert 508 the at least R subchannels and zero, or more, zero-value channel(s) into the P channels. In some embodiments, a size of the IFFT is equal to, or greater than, R+1 such that the size of the IFFT is an even number.

Additional Examples

Numerous embodiments will be apparent in light of the present disclosure, and features described herein can be combined in any number of configurations.

One example embodiment provides a partial band signal reconstruction circuit including a zero generator configured to generate zero or more zero-value channels; an analysis filter configured to be used in conjunction with a fast Fourier transform (FFT) to convert a wideband time-domain signal into K frequency-domain channels, and to select R subchannels of the K frequency-domain channels; and a synthesis filter configured to be used in conjunction with an inverse-FFT (IFFT) to receive the at least R subchannels from the analysis filter and the zero or more zero-value channels from the zero generator, and to convert the at least R subchannels and the zero or more zero-value channels into a time-domain signal, where wherein K and P are related by a constraint that constrains one or more parameters of the analysis filter and the synthesis filter. In some cases, the analysis filter comprises a K-point fast Fourier transform (FFT) filter bank, and wherein the analysis filter is configured to select R of the K channels. In some such cases, a size of the FFT is not equal to R. In some cases, the synthesis filter comprises a P-point inverse fast Fourier transform (IFFT) filter bank configured to convert the at least R subchannels and the zero or more zero-value channels into the P channels. In some cases, the constraint is defined as:

$$\frac{K}{M} = \frac{P}{L}$$

where L is an interpolation factor and M is a decimation factor. In some cases, the circuit includes an interpolation unit configured to interpolate each of the P channels by an interpolation factor of L, and a decimation unit configured to decimate each of the K channels by a decimation factor of M. In some cases, the synthesis filter is represented by:

$$\frac{w(v)P\sin\frac{\pi v}{KL}}{\pi v} = \sum_{m=-\infty}^{\infty} f(q-mL)h(mM-n); \forall q, \forall v$$

where w(v) is a taper window, f is an analysis filter, h a synthesis filter, L is an interpolation factor, and M is a decimation factor. In some cases, a communication receiver includes the circuit described above. In some cases, a communication system includes the circuit described above.

Another example embodiment provides a method of partial band signal reconstruction, the method including generating zero or more zero-value channels; generating K channels from a wideband time-domain signal; forwarding the K channels into at least R frequency-domain subchannels; receiving the at least R subchannels; and converting the at least R subchannels and the zero or more zero-value channels, which include P channels, into a time-domain signal. In some cases, the method includes using a fast Fourier transform (FFT) filter bank to convert the wideband time-domain signal into the K channels, and selecting the at least R subchannels from the K channels. In some such cases, a size of the FFT is not equal to R. In some cases, the method includes using an inverse Fourier transform (IFFT) filter bank to convert the at least R subchannels and the zero or more zero-value channels into the time-domain signal. In some cases, K and P are related by a constraint as follows:

$$\frac{K}{M} = \frac{P}{L}$$

where L is an interpolation factor and M is a decimation factor. In some cases, the method includes interpolating each of the P channels by an interpolation factor of L, and decimating each of the K channels by a decimation factor of M.

Yet another example embodiment provides a partial band signal reconstruction circuit including a zero generator configured to generate zero or more zero-value channels; an analysis filter configured to be used in conjunction with a K-point fast Fourier transform (FFT) to convert a wideband time-domain signal into K frequency-domain channels and to select at least R subchannels of the K frequency-domain channels; and a synthesis filter configured to be used in conjunction with a P-point inverse-FFT (IFFT) to convert the at least R subchannels and the zero or more zero-value channels into a time-domain signal. In some cases, the analysis filter and the synthesis filter are constrained as follows:

$$\frac{K}{M} = \frac{P}{L}$$

where L is an interpolation factor and M is a decimation factor. In some cases, the circuit includes one or both of: a fast Fourier transform (FFT) filter bank configured to convert the wideband time-domain signal into each of the K channels, from which at least R subchannels are selected; and/or an inverse fast Fourier transform (IFFT) filter bank configured to convert the at least R subchannels and the zero or more zero-value channels into the time-domain signal. In some cases, the circuit includes an interpolation unit configured to interpolate each of the P channels by an interpolation factor of L, and a decimation unit configured to decimate each of the K channels by a decimation factor of M. In some cases, a communications receiver or system includes the circuit described above.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

What is claimed is:

1. A partial band signal reconstruction circuit, comprising:
  a zero generator configured to generate zero or more zero-value channels;
  an analysis filter configured to
    be used in conjunction with a fast Fourier transform (FFT) to convert a wideband time-domain signal into K frequency-domain channels, and to select R subchannels of the K frequency-domain channels; and
  a synthesis filter configured to
    be used in conjunction with an inverse-FFT (IFFT) to receive the at least R subchannels from the analysis filter and the zero or more zero-value channels from the zero generator, and to convert the at least R subchannels and the zero or more zero-value channels which comprise P channels, into a time-domain signal;
  wherein K and P channels are related by a constraint that constrains one or more parameters of the analysis filter and the synthesis filter, and
  wherein the zero or more zero-value channels are greater than or equal to zero.

2. The circuit of claim 1, wherein the analysis filter comprises a K-point fast Fourier transform (FFT) filter bank, and wherein the analysis filter is configured to select R subchannels of the K channels.

3. The circuit of claim 2, wherein a size of the FFT is not equal to R.

4. The circuit of claim 1, wherein the synthesis filter comprises a P-point inverse fast Fourier transform (IFFT) filter bank configured to accept the at least R subchannels and the zero or more zero-value channels into the P channels.

5. The circuit of claim 1, wherein the constraint is defined as:

$$\frac{K}{M} = \frac{P}{L}$$

where L is an interpolation factor and M is a decimation factor.

6. The circuit of claim 1, further comprising an interpolation unit configured to interpolate each of the P channels by an interpolation factor of L, and a decimation unit configured to decimate each of the K channels by a decimation factor of M.

7. The circuit of claim 1, wherein the synthesis filter is represented by:

$$\frac{w(v)P\sin\frac{\pi v}{KL}}{\pi v} = \sum_{m=-\infty}^{\infty} f(q-mL)h(mM-n); \forall q, \forall v$$

where w(v) is a taper window, f is an analysis filter, h a synthesis filter, L is an interpolation factor, and M is a decimation factor.

8. A communication receiver comprising the circuit of claim 1.

9. A communication system comprising the circuit of claim 1.

10. The circuit of claim 1, wherein the zero or more zero-value channels are one or more zero-value channels.

11. A method of partial band signal reconstruction, the method comprising:
  generating zero or more zero-value channels;
  generating K channels from a wideband time-domain signal;
  forwarding the K channels into at least R frequency-domain subchannels;
  receiving the at least R subchannels; and
  converting the at least R subchannels and the zero or more zero-value channels, which comprise P channels, into a time-domain signal, wherein the zero or more zero-value channels are greater than or equal to zero.

12. The method of claim 11, further comprising using a fast Fourier transform (FFT) filter bank to convert the wideband time-domain signal into the K channels, and selecting the at least R subchannels from the K channels.

13. The method of claim 12, wherein a size of the FFT is not equal to R.

14. The method of claim 11, further comprising using an inverse fast Fourier transform (IFFT) filter bank to convert the at least R subchannels and the zero or more zero-value channels into the time-domain signal.

15. The method of claim 11, wherein K and P are related by a constraint as follows:

$$\frac{K}{M} = \frac{P}{L}$$

where L is an interpolation factor and M is a decimation factor.

16. The method of claim 11, further comprising interpolating each of the P channels by an interpolation factor of L, and decimating each of the K channels by a decimation factor of M.

17. A partial band signal reconstruction circuit, comprising:
a zero generator configured to generate zero or more zero-value channels;
an analysis filter configured to be used in conjunction with a K-point fast Fourier transform (FFT) to convert a wideband time-domain signal into K frequency-domain channels and to select at least R subchannels of the K frequency-domain channels; and
a synthesis filter configured to be used in conjunction with a P-point inverse-FFT (IFFT) to convert the at least R subchannels and the zero or more zero-value channels which comprise P channels, into a time-domain signal, wherein the zero or more zero-value channels are greater than or equal to zero.

18. The circuit of claim 17, wherein the analysis filter and the synthesis filter are constrained as follows:

$$\frac{K}{M} = \frac{P}{L}$$

where L is an interpolation factor and M is a decimation factor.

19. The circuit of claim 17, comprising one or both of:
a fast Fourier transform (FFT) filter bank configured to convert the wideband time-domain signal into each of the K channels, from which at least R subchannels are selected; and/or
an inverse fast Fourier transform (IFFT) filter bank configured to convert the at least R subchannels and the zero or more zero-value channels into the time-domain signal.

20. The circuit of claim 17, further comprising an interpolation unit configured to interpolate each of the P channels by an interpolation factor of L, and a decimation unit configured to decimate each of the K channels by a decimation factor of M.

* * * * *